W. M. SCHAFER.
DIRIGIBLE LIGHT.
APPLICATION FILED AUG. 30, 1919.
1,341,593.
Patented May 25, 1920.
2 SHEETS—SHEET 1.
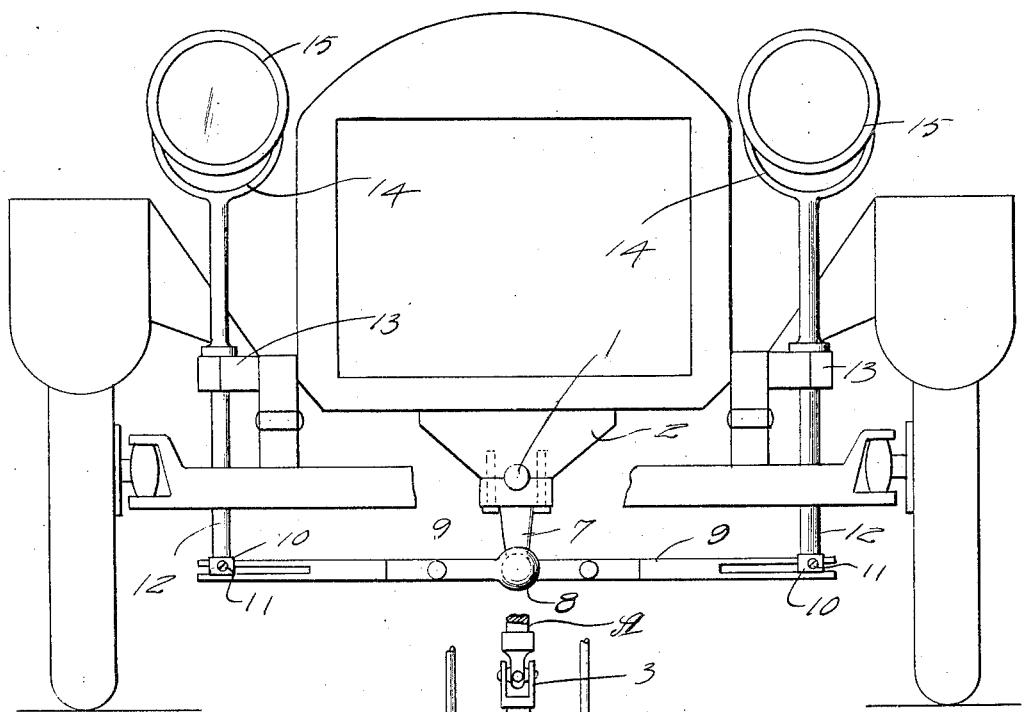
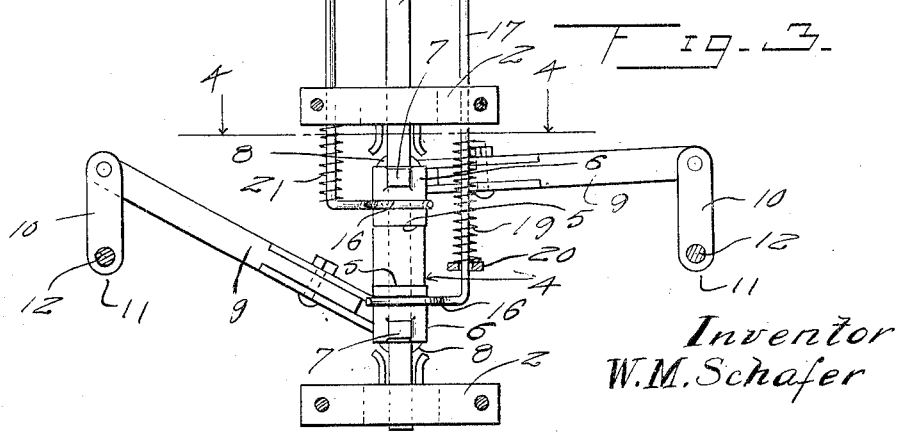
Inventor
W. M. Schafer

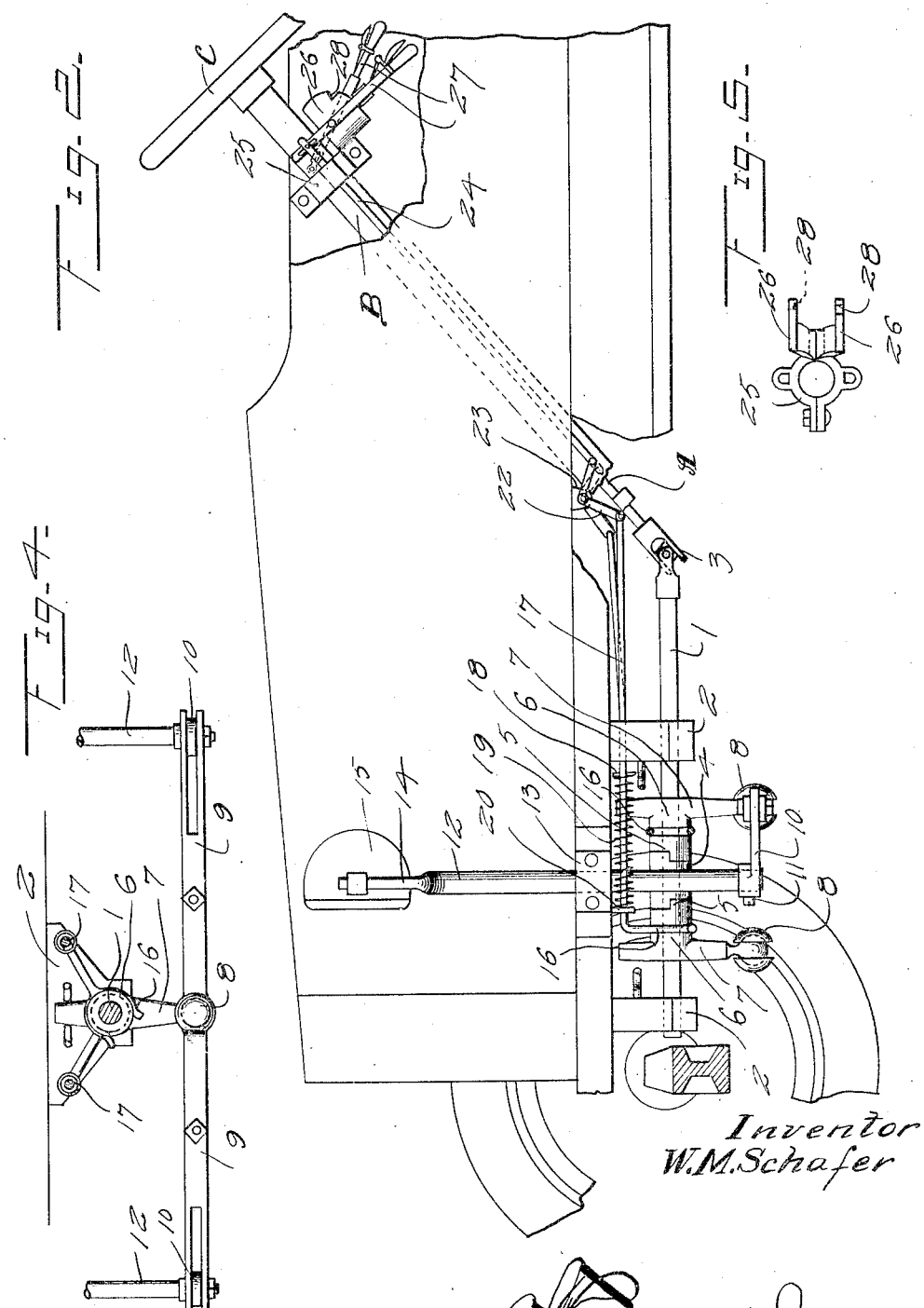

UNITED STATES PATENT OFFICE.

WILLIAM M. SCHAFER, OF JADWIN, MISSOURI.

DIRIGIBLE LIGHT.

1,341,593.  Specification of Letters Patent.  Patented May 25, 1920.

Application filed August 30, 1919. Serial No. 320,779.

*To all whom it may concern:*

Be it known that I, WILLIAM M. SCHAFER, a citizen of the United States, residing at Jadwin, in the county of Dent and State of Missouri, have invented certain new and useful Improvements in Dirigible Lights; and I do hereby declare the following to be a full, clear, and exact description of the invention, such as will enable others skilled in the art to which it appertains to make and use the same.

This invention relates to dirigible lights, and more particularly to dirigible headlights specially adapted for use in connection with automobiles.

One of the main objects of the invention is to provide a dirigible headlight for automobiles having means for turning the lights in accordance with operation of the steering shaft so as to direct the lights in the direction in which the vehicle is turning.

A further object is to provide simple and efficient means whereby the lights may be operated from the steering shaft.

Another object is to provide means whereby either light preferred may be operated, the other light remaining stationary, or both lights may be thrown into and out of operation, as desired.

Further objects will appear from the detailed description.

In the drawings:

Figure 1 is a front view illustrating two lights and operating means therefor constructed in accordance with my invention as applied.

Fig. 2 is a side view.

Fig. 3 is an enlarged detail plan view of the means for operating the lights.

Fig. 4 is a section taken substantially on line 4—4 of Fig. 3.

Fig. 5 is a detail plan view of the operating lever carrying bracket.

The dirigible headlight is intended to be used in connection with the steering gear of an automobile of standard construction, such as that illustrated, including a steering shaft A carrying the usual steering arm connected by a connecting rod to one of the steering spindle arms, these arms being connected by a rod in the well known manner, the steering shaft A being turned in proper direction by a steering rod extending through the post of standard B, this rod being turned in either direction by means of the usual steering wheel C. The steering shaft A and the parts associated therewith are of well known and standard construction and form no part of my invention except in so far as they coöperate with the means to be hereinafter described for operating the lights.

An operating shaft 1 is rockably mounted in hangers 2 beneath the forward portion of the automobile body, and is disposed longitudinally thereof. This shaft is connected at its rearward end by a universal connection 3 to the forward end of the steering shaft A which may be extended for this purpose. A double clutch member 4 is secured on shaft 1 midway between the hangers 2. This clutch member is adapted to coöperate with clutch elements 5 formed on the inner ends of sleeves 6 loosely mounted on shaft 1 adjacent the opposite ends of the clutch member 4. Each of the sleeves 6 is provided with an integral radially extending arm 7 the outer end of which is connected by a ball and socket joint 8 to the inner end of a link 9 the outer end of which is pivoted to one end of a relatively short link 10, the other end of which is detachably secured by a set screw 11 to the lower end of a lamp standard 12 rockably about a vertical axis in supporting brackets 13 carried by the automobile at each side thereof. Each lamp standard 12 is provided at its upper end with a fork 14 which carries the usual headlight 15. As will be readily understood, the relatively short links 10, being positioned at opposite sides of the axis of the operating shaft 1, are oppositely disposed so that the standarads 12 and the lamps 15 carried thereby will be turned in the same direction when arms 7 are operatively connected to the shaft and the shaft is raised.

Each of the sleeves 6 is provided with an annular groove which receives a fork 16 at the forward end of a shifting rod 17 slidable through the rearward hanger 2. The forward shifting rod, or more correctly stated the shifting rod which is connected to the forward sleeve 6, is formed with an outwardly projecting finger 18 intermediate the fork 16 and hanger. An expansion coil spring 19 is mounted about this rod and is confined between said finger 18 and a guide member 20, through which the rod operates, positioned a short distance in rear of fork 16, this guide member being fixed to the dust pan or other suitable part of the automobile. A similar spring 21 is mounted about the other rod 17 being confined between the fork 16 thereof and the rearward hanger 2. These springs act to normally force the sleeves 6 toward the double clutch member 4 so as to hold the clutch elements 5 in operative engagement therewith.

The rods 17 are connected at their rearward ends to the vertical arms of bellcrank levers 22 which are rockably mounted at their angles for movement about a horizontal axis in a supporting bracket 23 secured to the under face of the floor of the automobile. Rods 24, which are slidable through the floor of the automobile, have their lower ends pivotally secured to the rearward ends of the horizontal arms of the bell cranks, said rods extending along the side of the steering post B and through a bracket 25 secured to the steering post. The bracket 25 is provided with raised portions 26 which are adapted to be engaged by crank elements 27 formed at the upper ends of the rods 24, each of the raised positions having an arcuate recess 28 to receive the crank elements. By operating the rods 24, either of the sleeves 6, selectively, may be operatively connected to the shaft 1, or both of these sleeves may be disconnected from the shaft, as desired. When the sleeves 6 are connected to the shaft, both of the lights will be turned simultaneously in the direction in which the vehicle is turned, this turning of the lights being effected by means of the operating shaft 1 and the connections between arms 7 and the light standards. If but one light is connected to the shaft, it will be operated in a similar manner upon the shaft 1 being rocked. By removing the set screws 11, the lamp standards may be readily detached from the means for operating the same, thus permitting the lamps to be readily turned so as to direct the light therefrom onto the engine or front portion of the automobile, when desired.

As will be understood, in practice it may be found desirable to resort to slight changes in details of construction and arrangement of the various parts of the invention, and I intend to include all such variations, as fall within the scope of the appended claims, in this application in which a preferred form only of my invention is disclosed.

What I claim is:

1. The combination with the steering shaft of an automobile steering gear, of an operating shaft connected to said steering shaft for turning movement therewith, lamp standards rockably mounted at opposite sides of said operating shaft, sleeves loosely mounted on the operating shaft and provided with outwardly projecting arms, connections between said arms and the standards for turning the standards in the direction in which the operating shaft is turned when the arms are operatively connected to said shaft, and means for optionally connecting said sleeves to the shaft for turning movement therewith.

2. The combination with the steering shaft of an automobile steering gear, of an operating shaft connected to said steering shaft for turning movement therewith, lamp standards rockably supported at opposite sides of said operating shaft, sleeves loosely mounted on the operating shaft and provided with outwardly projecting arms, links connected at their inner ends to said arms, links secured on the lower ends of the respective lamp standards and pivotally connected to the outer ends of the first mentioned links, and means for connecting either of said sleeves, selectively, to the operating shaft for turning movement therewith.

3. In dirigible lights, a rockably mounted shaft adapted to be secured to the steering shaft of an automobile steering gear for turning movement therewith, sleeves loosely mounted on said shaft and each provided with an outwardly projecting arm, lamp standards rockably mounted at opposite sides of said shaft, links secured at one end upon the lower ends of the respective lamp standards, said links being oppositely disposed, links having their outer ends pivotally secured to the other ends of said first mentioned links and their inner ends connected to said arms for movement therewith, and means for optionally operatively connecting either one or both of said sleeves to the shaft for turning movement therewith.

In testimony whereof I affix my signature in presence of two witnesses.

WILLIAM M. SCHAFER.

Witnesses:
W. P. ELMER,
C. A. WALLOF.